V. L. EMERSON.
PROCESS FOR THE CONVERSION OF HYDROCARBON OILS.
APPLICATION FILED MAY 10, 1920.
1,414,400.
Patented May 2, 1922.
2 SHEETS—SHEET 1.
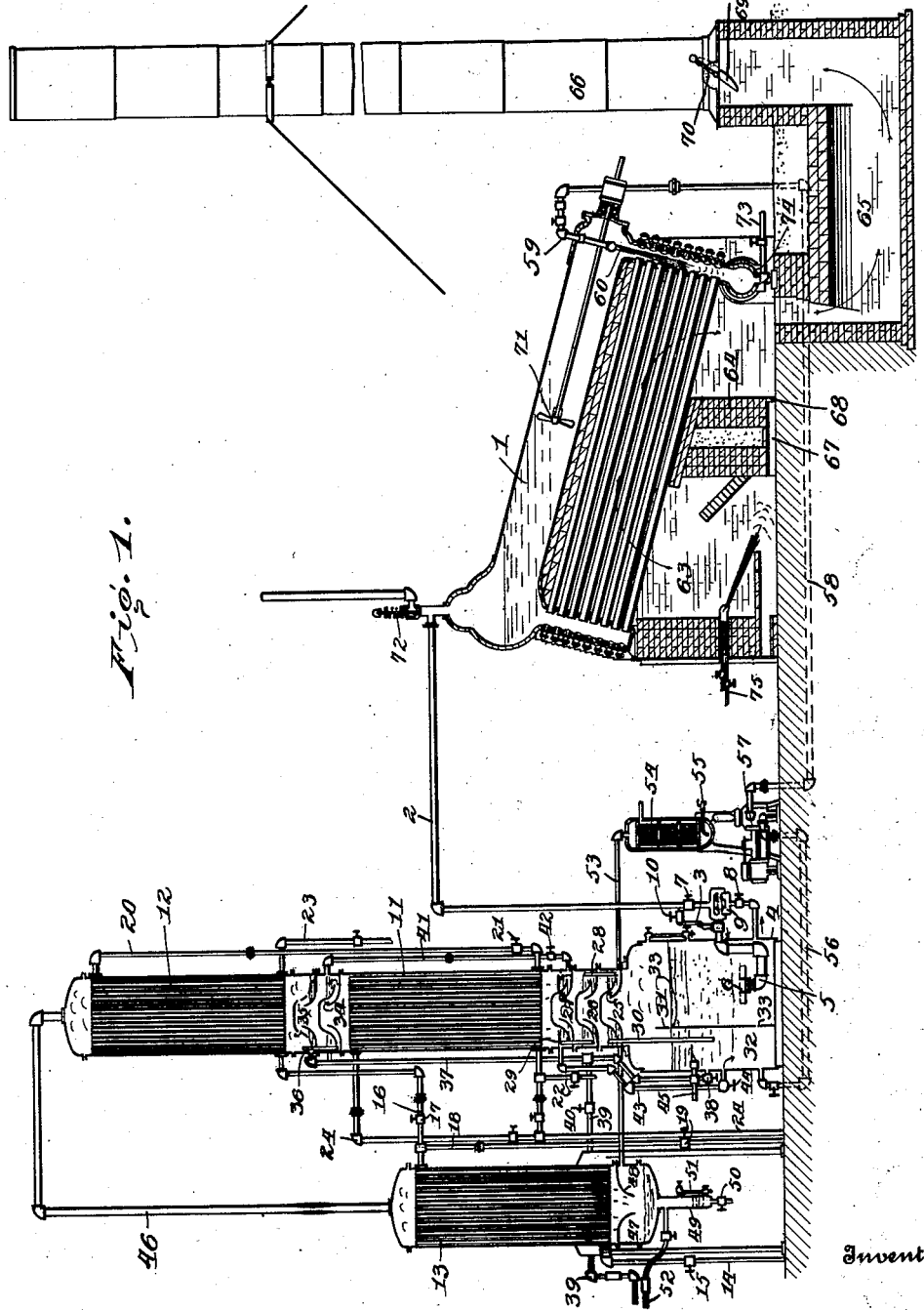
Inventor
Victor Lee Emerson.
By Lawrence S. Paddock
Attorney

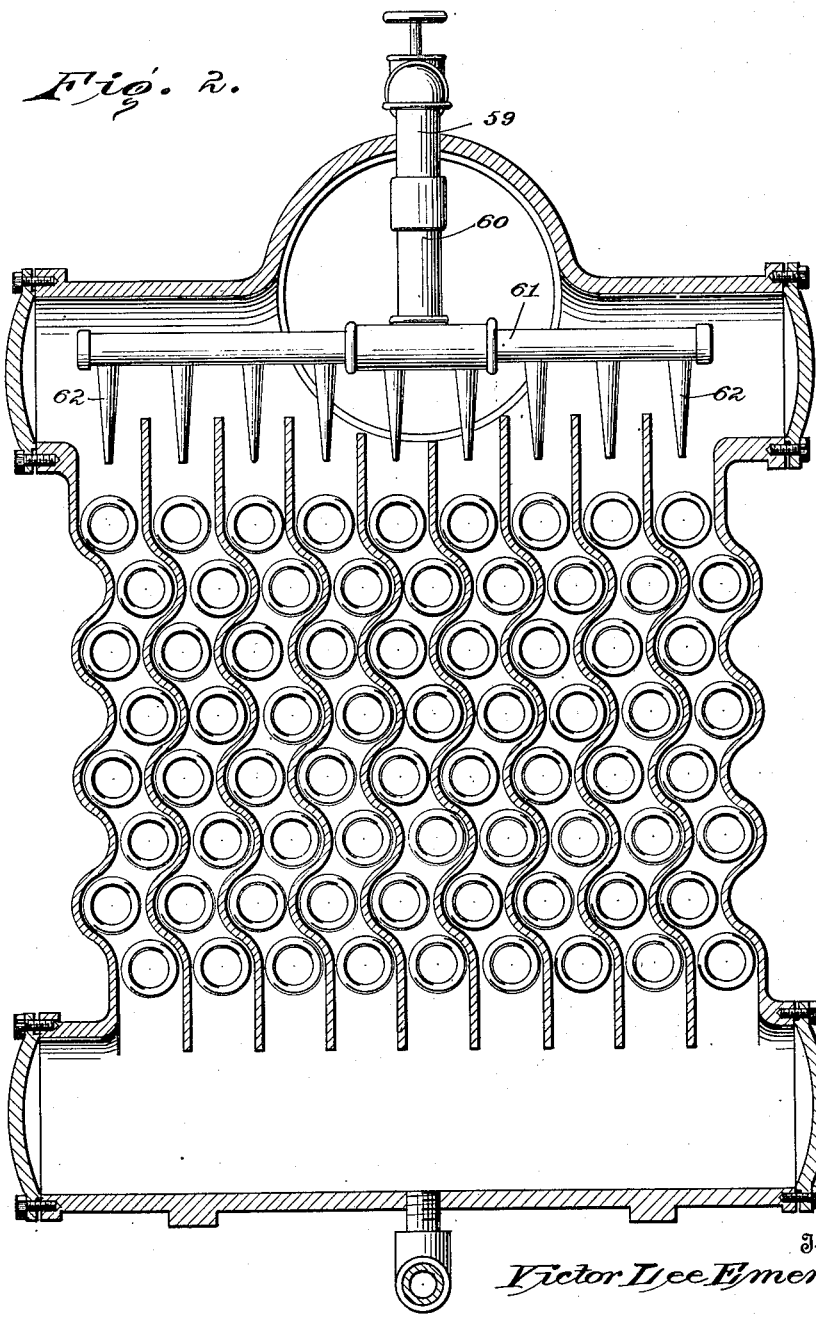

UNITED STATES PATENT OFFICE.

VICTOR LEE EMERSON, OF PHILADELPHIA, PENNSYLVANIA.

PROCESS FOR THE CONVERSION OF HYDROCARBON OILS.

1,414,400.  Specification of Letters Patent.  Patented May 2, 1922.

Application filed May 10, 1920. Serial No. 380,171.

*To all whom it may concern:*

Be it known that I, VICTOR LEE EMERSON, a citizen of the United States, residing at Philadelphia, county of Philadelphia, and State of Pennsylvania, have invented certain new Improvements in Processes for the Conversion of Hydrocarbon Oils, of which the following is a specification.

While this invention relates broadly to distillation and conversion of complex chemical combinations into new atomic groups, it relates more specifically to a process for the conversion of heavy hydrocarbon oils into lighter hydrocarbon oils. This application is a continuation in part of my application Serial No. 379,358 filed March 6, 1920.

It is an object of my invention to eliminate the impurities in the oil, such as sulphur and water and similar foreign compounds to prevent them from forming objectionable combinations in the still, such as carbon bisulphide, and to prevent the elements of oxygen and hydrogen contained in any water present in the oil from forming explosive compounds by uniting with the carbonaceous vapors or gaseous products in the still. Heretofore oil stills have usually been fed directly with the oil without previously treating the same so that the impurities or foreign matter referred to are removed, which often results in the destruction of the still or serious interference with the operation of the process. Violent explosions have taken place where there was apparently little pressure on the still. These are apparently due to the result of a quantity of water or moisture being fed to the still while it is at a high temperature. Sulphur also accompanies the oil in many cases. The oxygen of the water, combining with the carbonaceous gases, forms chemical combinations in which combustion takes place, rapidly supported by the hydrogen contained in the water and the sulphurous gases present, resulting in violent explosions.

With the present method, these dangers are entirely avoided as the contained water and sulphur compounds and other impurities are removed prior to the introduction of the oil into the still. It is an object of the present invention to provide for the removal of impurities or foreign compounds from the oil prior to the admission of the same into the still.

It is a further object of the present invention to utilize the heat in the gaseous products coming from the still to preheat the oil before it is pumped into the still. This results in the evaporation of any water held in suspension and removes any sulphurous compounds that might enter into combination with either the oil, water or gaseous products. At the time time, a portion of the heavier products coming over in gaseous form from the still, are condensed by contact with a body of oil which is at a lower temperature and conversely the readily vaporizable material in the body of oil is transformed into vapor by the heat transmitted to the same from the gaseous products brought in contact therewith.

It is likewise an object of my invention to subject the heavier oil to the heat of the gaseous products of distillation and, to combine the same with such products from the still as are condensed on contact with the body of oil at a lower temperature. The preheated and pretreated oil and condensates are injected into the material undergoing distillation in the still and are subjected to a cracking reaction by reason of the higher temperature of the material into which they are injected.

It is obvious that the material into which they are injected is at a higher temperature than the material injected. This is due to the fact that the material in the still has been robbed of the lower boiling oils by distillation.

In carrying out my process, the hydrocarbons having a relatively low boiling point, are subjected to the heat of the residual hydrocarbons undergoing treatment under high pressure and temperature which have a high boiling point. The supply of low boiling hydrocarbons to the high boiling hydrocarbons in the still not only utilizes the temperature and heat of the high boiling hydrocarbons to cause a cracking reaction of the lower boiling hydrocarbons, but the low boiling hydrocarbons, when intermixed with the high boiling hydrocarbons, act to maintain the entire mixture in such a state as to avoid the formation of hard carbon and free gas by excessive cracking due to the extreme temperatures accompanying a reduction of the distillate to a high boiling point. This action is present to a large extent in the ordinary processes.

The present invention relates to a process which is independent of the step of impact claimed in my co-pending application Serial No. 379,358, filed May 6, 1920, and the apparatus herein disclosed provides a means for carrying out the process herein claimed independent of said step of impact.

Other objects and advantages of the invention will appear hereinafter.

In order to render my present invention clear, reference is had to the accompanying drawings in which:

Figure 1 is a vertical section of one form of apparatus adapted for carrying out the conversion of hydrocarbon oils;

Figure 2 is a vertical section of the rear header of the still shown in Figure 1, illustrating in particular the liquid impelling apparatus.

In the apparatus disclosed in Fig. 1, I employ a still shown at 1. While it is within the scope of my invention to employ various types of stills, I prefer to use the type which is herein shown, being the type of still shown in my Patent No. 1,337,831, granted April 20, 1920, with certain modifications as will hereinafter appear. While my process is capable of being carried out through a wide range of temperatures and pressures, and the details of the apparatus are capable of variation within the scope of my invention which is not limited to the particular temperatures, pressures or details mentioned or disclosed, the following is an example of the execution of my process in a particular instance. While my process is adapted for the conversion of hydrocarbon oils broadly, I find that satisfactory results, when operating on fuel oil, will be obtained by the use of a pressure in the still of 75 to 100 pounds per square inch with an accompanying temperature of seven hundred to eight hundred degrees Fahrenheit. With this temperature and pressure, a cracking reaction will take place with the attendant formation of gaseous products.

The products of distillation which come over from the still includes true gases, such as hydrogen, vapors, saturated vapors and gases, and particles of the material undergoing distillation which remain in the liquid form and are held in suspension by the gaseous products. I use the term "gaseous products" to cover all the material coming over from the still as described.

In carrying out the present process the gaseous products of distillation are conducted by means of the pipe 2 and by-pass 3 into the receptacle 4 through the pipe 5 and perforated head 6. At this time the valves 7 and 8 are closed thus preventing the gaseous products of distillation from passing through the jet apparatus illustrated at 9. A valve 10 is placed in the by-pass 3. The gaseous products of distillation pass from the perforated head 6 through the fluid in the receptacle 4 as indicated in the form of bubbles in the drawing. Those portions of the gaseous products which are condensable at the temperature at which the liquid in the receptacle 4 is maintained, are condensed. Those gaseous products which are not condensed pass upwardly through a series of condensers and traps hereinafter described.

A primary condenser is illustrated at 11; a secondary condenser, at 12 and a final condenser at 13. In the particular embodiment of my invention shown, I employ three condensers as described, but it is to be understood that it is within the scope of my invention to vary the number of condensers according to the result required. The final condenser 13 is supplied with water as a temperature-maintaining medium by the pipe 14 controlled by the valve 15. The water, after having passed upwardly through the condenser 13, is conducted by a pipe 16 to the base of the condenser 12. The flow of the water in the pipe 16 is controlled by the valve 17. A by-pass for the water is provided by the pipe 18 in which is placed a valve 19. It is desirable in this embodiment of my invention to keep the temperature of the condenser 12 at or about the boiling point of water. The steam formed in the condenser 12 is conducted by the pipe 20 to the base of the condenser 11, and maintains the temperature of the condenser 11 at the desired point. A valve 21 is placed in the pipe 20. It will thus be seen that the temperature-maintaining means employs a cycle of operation in which a vaporizable fluid is caused to maintain the temperature in the final condenser, thereafter is converted into vapor in a secondary condenser and the vapors thus produced are caused to maintain the temperature in the primary condenser. The various temperatures at which the condensers are maintained are regulated so that they correspond to the condensing temperature of the product which it is desired to condense.

For the purpose of maintaining the desired temperature of the condensers during the preliminary stage of operation, steam is fed to the condensers by pipes 22 and 23. The pipes 22 and 23 are provided with valves as shown. The waste steam is led away through the pipe 24. Beneath the primary condenser 11 is a series of traps, indicated by the numerals 25, 26 and 27. The traps 25 and 26 are connected by stand-pipes 28. The traps 26 and 27 are connected by stand-pipes 29. The trap 25 is connected with the receptacle by a pipe 30 which extends downwardly into the liquid in the receptacle 4. A partition 31 is placed in the receptacle 4 which divides off a portion of the liquid therein and forms a chamber 32 as shown. The pipe 30 extends into the chamber 32. The partition 31 is provided with apertures 33 for the purpose of equalizing the liquid level in the receptacle 4. Between the primary condenser 11 and the secondary condenser 12 are placed the traps 34 and 35. The trap 34 is connected with the trap 35 by stand-pipes 36. A pipe 37 connects the trap 35 with the chamber 32. A valve 38 is placed in the pipe 37 so as to control the fluid passing into the chamber 32. A pipe 39 is connected to the pipe 37. A valve 40 is placed in the pipe 39. The pipe 39 leads to a storage or run-down tank not shown. The trap 34 is connected to the trap 27 by a pipe 41. A valve 42 is placed in the pipe 41. A pipe 43 connects the upper trap 27 with the chamber 32 in the receptacle 4. A valve 44 is placed in the pipe 43. A supply of fresh oil is conducted into the chamber 32 of the receptacle 4 by a pipe 45. It is desirable to place a check valve in the pipe 45 as shown. The condensers 12 and 13 are connected by a pipe 46. The final condenser 13 is provided with a chamber 47, at its base in which is placed a plate 48 acting to guide the condensates through an aperture therein to the lower part of the chamber 47. A trap 49 is provided with a valve controlled outlet 50 and a liquid level gauge 51. From the upper portion of the trap 49 a pipe 52 leads to a storage or rundown tank, not shown. The gauge 51 indicates the level of water or other liquid impurities which collect in the trap 49. From the chamber 47 a gas-conducting pipe 53 leads to a condensing apparatus 54. The condensing apparatus 54 is provided with a valve-controlled outlet 55. From the chamber 32 in the receptacle 4 a pipe 56 leads to a pump 57. In the present instance the pump is illustrated as steam-driven but it is obvious that it may be driven by any suitable power. The pump 57 discharges through a pipe 58 into the rear header of the still 1 as shown at 59. In order to use the incoming fluid to cause a circulation in the still 1, I have provided a jet apparatus indicated by the numeral 60. This jet apparatus is composed of a spreader pipe 61 which is provided with a series of nozzles 62. The nozzles 62 project downwardly between the partitions of the rear header and serve to impel the liquid undergoing distillation by the force of the incoming jets. This causes a rapid circulation of the fluid in the still. As will be seen, the fluid passing through the jets is injected into the fluid undergoing distillation so as to cause a uniform circulation.

The type of still that I have shown is provided with an oil-burning furnace indicated at 63. I find it desirable to direct the flame of the burner downwardly as shown so that the heat therefrom will be conducted to the tubes by radiation rather than by direct contact therewith. I find this assists in avoiding over-cracking of the oil due to excessive localized heat and results in a more even distribution of the heat. A partition 64 is so placed that gases of combustion are caused to pass from the upper end of the tubes along their length and thence downwardly through the pit 65, from whence they escape through the stack 66. The partition 64 is so constructed as to form a passage 67 at the bottom thereof. This passage is normally obstructed by a brick or bricks indicated at 68. If it should happen that from any cause the tubes or other portion of the still should be so destroyed as to allow an escape of oil the oil would push the brick or bricks 68 out of the passage 67 and the oil would fill the pit 65 thus forming a liquid seal in such a manner as to cut off the draft. This effectually stifles the conflagration which would follow if the draft were not shut off.

In the base of the stack 66 is placed a weighted valve 69 which is held in open position by a plug 70 of such material as will be effected by excessive heat in such a manner as to destroy the function thereof. I find that a plug of wood in this position satisfactorily performs the desired function, although other temperature-responsive material might be used. If the temperature of the gases of combustion passing through the stack becomes so great as to destroy the plug the weight on the valve will cause the valve to close off the draft thereby reducing the temperature of the still below the danger point.

When operating with viscous material it is desirable to use a mechanical fluid-propelling device such as a propeller which I have shown at 71 in combination with the jets 62. When this is done the pipe connections to the jet apparatus 60 will be so formed as to permit of the proper location of the driving means for the propeller. It may be found desirable to use either the propeller or the jets alone in certain instances. A safety valve 72 is located in the pipe line 2 to relieve any dangerous pressure in the still. A drain pipe shown at 73 permits the removal of the residues which collect in the trap 74. A fuel burner located at 75 is so designed as to direct the flame downwardly in the furnace 63 as shown.

The operation of the above described embodiment of my invention is as follows:

In the preliminary stages of operation the oil to be treated is admitted through the pipe 45 until it fills the receptacle 4 and the still 1 to the desired level. During this operation the pump 57 may be used to force the oil into the still through the pipe 58 and jet apparatus 60. At this time the oil in receptacle 4 will equalize its level through the apertures 33 in the partition 31. The oil being at the desired level the furnace is set in action.

The gaseous products of distillation enter the oil in receptacle 4 and pass upwardly as shown in the form of bubbles in the drawing. Here the gaseous products give up heat to the oil and maintain the temperature thereof at the desired point. The temperature of the oil in the receptacle 4 is maintained at such a degree as will vaporize any impurities therein, such as water and sulphur compounds. Such of the gaseous products issuing from the head 6 as are condensable at the temperature at which the oil in the receptacle 4 is maintained will be condensed on contact with said oil. The addition of condensates thus formed to the oil in the receptacle 4 causes a flow through the openings 33 in the partition 31 into the chamber 32. The fresh oil entering the chamber 32 is at a lower temperature than the oil on the opposite side of the partition 31. A heat-transference therefore takes place between the oil on opposite sides of the partition 31. This heat-transference coupled with the loss of heat by vaporization keeps the temperature of the oil in the receptacle 4 below that of the gaseous products issuing from the head 6. By reason of this heat-transference the fresh oil in the chamber 32 is partly robbed of its lower boiling constituents and such impurities as are vaporizable, such as water and sulphur compounds, the vapor of which mingles with the gaseous products which collect over the surface of the oil in the receptacle 4, are removed. The mixture of the gaseous products and vaporized impurities passes up through the traps 25, 26 and 27, thence through the condenser 11, traps 34 and 35, condenser 12, pipe 46 and final condenser 13 wherein said mixture is acted upon by the successively decreased temperature of the successive zones of temperature formed by said traps and condensers. As heat is progressively extracted from the gaseous products the temperature of the successive zones is automatically maintained on a progressively decreasing scale. The condensates from the condensers 11 and 12 descend so as to fill the traps 25, 26 and 27, 34 and 35 to the level shown, which is controlled by the height of the stand-pipes as shown. The pipe 37 enters the trap 35 at a point below the top of the stand-pipes 36. When the valve 38 is opened to pass the condensates in the trap 35 into the chamber 32 in the receptacle 4 the level in the trap 35 is brought below that of the stand-pipes 36 so that the condensates in the trap 35 are not passed to the trap 34. Conversely when the valve 38 is closed or so regulated that the condensates do not flow through the pipe 37 as rapidly as they are collected in the trap 35 the condensates in the trap 35 or a portion thereof pass to the trap 34. The pipe 41 allows the condensates in the trap 34 to pass to the trap 27. The flow of the condensates through the pipe 41 is controlled by the valve 42. The condensates in the trap 27 may pass both by the stand-pipes 29 to the trap 26 and by the pipe 43 to the chamber 32. The flow of condensates through the pipe 43 is controlled by the valve 44. The condensates from the trap 26 pass to the trap 25 through the stand-pipes 28. From the trap 25 the pipe 30 conducts the condensates to the chamber 32 as shown. The mixture of gaseous products and vapors pass successively through the condensates in the several traps, and as the condensates are maintained at successively decreased temperatures those constituents of the gases and vapors will be condensed which are condensable at the temperature at which the condensates in the several traps are maintained. The temperature of the condensers 11, 12 and 13 is maintained at the point which will condense the constituents of the gaseous products which form the desired products. It will be seen that by opening the valve 38 such portion of the condensates in the trap 35, as it is desired to mix with the contents of the chamber 32, may be passed thereto. By opening the valve 42, condensates from the trap 34 may be passed into the trap 27; and by opening the valve 44, condensates from the trap 27 may be passed to the chamber 32. A final product is conducted through the pipe 39 to a run-down tank not shown. The condensates from the final condenser 13 collect in the chamber 47, in the base thereof and are drawn off by the pipe 52. The pipe 52 is bent upward so as to cause the level of the condensates in the chamber 47 to correspond to the level of the highest portion of the pipe as shown. The temperature of the condenser 13 is maintained below the boiling point of water and consequently the vapor and volatilized sulphur compounds carried over with the hydrocarbon gaseous products will be condensed and settle in the trap 49 and may be drawn off by the valve 50. The sight gauge 51 indicates the level of these impurities so that they may be drawn off before reaching too great a height in the trap 49. Any fixed or non-condensed gases in the chamber 49 will pass off through the pipe 53 to the condenser 54. The condensates from the condenser 54 may be drained off through the pipe 55. The condensates drained off by the pipe 52 form a final product of lighter gravity than those drawn off through the pipe 39. It will be readily understood that the gravity of the final products may be varied by suitable regulation of the temperature used and the treatment to which they are subject. The several condensers and traps will be maintained at temperatures known to condense the desired products.

To facilitate the description I will refer to the apparatus at the left of Fig. 1 to which the gaseous products from the still 1 are delivered as the primary still and the still 1 as the secondary still, since the oil is first treated to partial distillation in the chamber 32 of receptacle 4 and to further distillation in the still 1. The pump 57 draws the oil from the chamber 32 by way of the pipe 56 and forces it under pressure into the material undergoing distillation in the still 1 by way of jet apparatus 60. The jets 62 deliver the oil with great velocity downwardly into the passages between the partitions of the rear header, as shown in Fig. 2, thereby promulgating a rapid circulation of the oil undergoing distillation. This rapid circulation promotes an even temperature throughout the oil and reduces the formation of hard carbon and free gas due to over-cracking. Thus is produced a continuous cycle of operation.

Those condensates which are delivered to the chamber 32 are fed to the secondary still along with the pre-heated and pre-distilled fresh oil. The admixture of the condensates and pre-heated and pre-distilled oil with the material undergoing distillation in the secondary still, keeps said material in the secondary still at a temperature which reduces to a large extent the formation of hard carbon and free gas due to over-cracking at excessive temperatures. The injected material is also subjected to a cracking reaction by reason of the higher temperature of the material in the still whose boiling point has been raised due to the loss of lower boiling oils therefrom in the process of distillation.

In carrying out my process, the water vapor present may enter into the action taking place in the reaction chamber, a hydrogenating effect taking place. If desired, water could be added to the heavy oil in the receptacle, in order to increase a hydrogenating effect. Hydrogen gas could also be admitted in the same manner and for the same purpose.

While this particular embodiment of my invention has been described with reference to the treatment of petroleum for the production of lighter hydrocarbons, it is of course to be understood that my process is equally applicable to chemicals other than hydrocarbons. It is also to be understood that other conditions and reactions than those described may be present in the process and come within the scope of the appended claims.

What I claim is:

1. The process of converting heavy hydrocarbon oils into lighter hydrocarbon oils which consists in distilling a mass of heavy hydrocarbon oils under pressure, progressively separating the gaseous products of distillation by condensation in a series of zones of successively lower temperature, subjecting a portion of the condensates to a heat interchange with the freshly formed gaseous products of distillation by intimate contact with said condensates, mixing a fresh mass of oil with said condensates, and returning the resultant mixture into the material undergoing distillation under pressure, and drawing off such condensates as are desirable as a final product.

2. The process of converting heavy hydrocarbon oils into lighter hydrocarbon oils which consists in distilling a mass of heavy hydrocarbon oils under pressure, separating the gaseous products of distillation by condensation in a series of zones of successively lower temperature, mixing a portion of the condensates thus formed with a fresh mass of heavy hydrocarbon oil, subjecting the mixture thus formed to a heat interchange with a condensate of relatively higher temperature, feeding said mixture, whose heat is thus raised into the material undergoing distillation under pressure and drawing off those condensates which are desirable as a final product.

3. The process of converting heavy hydrocarbon oils into lighter hydrocarbon oils which consists in distilling a mass of heavy hydrocarbon oils under pressure, separating the gaseous products of distillation by condensation in a series of zones of successively lower temperature, maintaining certain of said zones at the desired temperature by a heat interchange between said gaseous products of distillation and a separate fluid in its liquid state, converting said fluid into the gaseous state by the heat imparted thereto by a heat transference from said products of distillation from one zone and utilizing said gasified fluid to maintain the temperature in another zone.

4. The process of converting heavy hydrocarbon oils into lighter hydrocarbon oils which consists in distilling a mass of heavy hydrocarbon oils under pressure, separating the gaseous products of distillation by condensation in a series of zones of successively lower temperature, maintaining said zones at the desired temperature by a heat interchange between said gaseous products of distillation and a separate fluid in its liquid state at a relatively low temperature, said fluid in a liquid state at a relatively higher temperature sufficient to convert said fluid into a gaseous state and said fluid thus converted into a gaseous state at a yet relatively higher temperature.

5. The process of converting heavy hydrocarbon oils into lighter hydrocarbon oils which consists in distilling a mass of heavy hydrocarbon oils under pressure, bringing the gaseous products of distillation into intimate contact with a mass of cooler oil, mixing said oil and such condensates as are formed on contact with the cooler oil with a mass of fresh oil, and feeding the resultant mixture, thus formed, into the material undergoing distillation under pressure.

6. The process of converting heavy hydrocarbon oils into lighter hydrocarbon oils which consists in distilling a mass of heavy hydrocarbon oils under pressure, bringing the gaseous products of distillation into intimate contact with a mass of cooler oil, subjecting a separate mass of fresh oil to the heat of said mass of cooler oil whose temperature has been raised by contact with the gaseous products of distillation above the temperature of said mass of fresh oil, separating by condensation the gaseous products thus formed, mixing with the liquid residuum of the fresh oil thus treated a portion of the condensates of said gaseous products and a portion of the oil which has been subjected to intimate contact with the gaseous products of distillation together with condensates formed on contact of the products of distillation with said cooler oil, feeding the mixture of oil and condensates thus formed into the material undergoing distillation under pressure, and drawing off such of the condensates as are desirable as a final product.

In testimony whereof I have hereunto set my hand.

VICTOR LEE EMERSON.